UNITED STATES PATENT OFFICE 2,205,094

FOOD PRODUCT AND METHOD FOR ITS PREPARATION

Frederick Hammond, Charleston, W. Va.

No Drawing. Application April 4, 1938,
Serial No. 199,762

4 Claims. (Cl. 99—182)

The invention herein disclosed relates to food products, and to methods for making food products.

The prior art knows many mixed food products. Examples are pork and beans, beef stew, corned beef hash, spaghetti and tomato sauce, spaghetti and ground meat. The purpose of such a type of food material is to provide, more or less completely, simultaneously, all the food materials, such as carbohydrates, proteins, vegetable materials, that go to make a complete meal. All these preparations are made and packaged commercially. However, each of these preparations requires, in at least one of the stages included in the making and packaging of such a preparation, a manual operation which is expensive and unhygienic; the whole process of making and packaging is never completely automatic. For instance, the present general practice as to spaghetti is to have it made in one plant, dried, sent to another plant, prepared, weighed and canned by manual process. In the case of pork and beans, the beans must be hand-picked, and the pork must be cut into suitable pieces by hand and manually inserted in the can.

The canning industry exists in such a form at present that most canners have a heavy investment in plants which perform at peak capacity only for a few weeks during summer and fall. As a result, there is a great need for what is known in the canning trade as dry pack items that can be made during the slack season. The chief types of such packaged food materials are soups and the type of mixed food materials referred to.

The industry producing dried, ready-to-eat cereal products manufactures products having the form of flakes, crumbles, shreds, exploded whole grains, etc. Some of these cereals are combined with other non-cereal foods, such as raisins, to make a mere mechanical mixture of which bran flakes and raisins is an example.

One purpose of this invention is to provide a new type of mixed food product characterized by a new structure, which confers on such products new properties as to ease of making and mechanical handling, in conveying and packaging.

A further purpose of this invention is to provide the canning industry with a new type of combination food product which can be made and canned cheaply by an automatic process, and which can be made economically during the slack season.

A further purpose of this invention is to provide the dry, ready-to-eat cereal industry with a new type of combination cereal food, which combines two of the well recognized breakfast foods, cereals and fruits.

A further purpose of this invention is to provide the food industry in general and the two branches thereof referred to in particular with a new process for manufacturing cheaply, automatically, and hygienically a new type of mixed or combination food product.

Further important objects of this invention will become apparent from the following description and appended claims.

The new type of mixed food product of this invention is a cored tube having a core of one type of food material and an outer continuous, tubular sheathing of a different food material. There is a great latitude as to the shape and size of this cored tube; moreover, the core may or may not occupy completely the hollow space contained by the outer tubular sheathing. This cored tube when first made contains a substantial amount of water; it is subjected to a drying process which may dry only the outer surface of the tubular sheathing, or also other parts or all of the structure.

The apparatus used to make this new type of product may be a suitably modified and augmented extrusion machine which can be either of the screw type or of the hydraulic type, employing a specially constructed die providing for the introduction of the core material through a metal tube attached to a supplementary extrusion mechanism. The primary mechanism may be of the type commonly employed in the macaroni industry. The extrusion pressure in the supplementary machine can be controlled to conform to the specific viscosity of the materials being cored, and also to conform to the pressure required for the particular material constituting the core. The product is extruded directly into a suitably designed drying chamber, provisions being made for the cutting off and automatic conveyance of the more or less dried products therefrom, and for the weighing or otherwise making up of the dried products into predetermined amounts preparatory to the packaging, which is also automatic.

Those skilled in the art will find it easy to apply the principles of the invention herein disclosed to each specific case desired. It is obvious that, depending upon the particular combination and ratio of food materials used, the particular size and shape of the product desired, the particular amount of drying desired, the particular type of packaging used, certain modifications of the process and of the apparatus are necessary. These modifications are obvious and inherent in the invention disclosed. A few illustrative examples of this invention will now be given. It is understood that these examples comprise only a few methods of carrying out this invention, selected from the many methods that this invention contemplates.

*Example 1.*—This example includes products in which the outer continuous, tubular sheathing consists of farinaceous material similar to that used in the manufacture of macaroni. The inner core may consist of protein material, such as ground, cooked meat, grated cheese, or of vegetable material, such as tomato sauce, celery or onions, or combinations of one or all of these materials. Each individual case in these examples will vary in the following requirements of the finished article:

Ratio desired between amounts of farinaceous and core materials.

Size and shape of product desired. Amount, if any, of space inside the tubular sheathing not occupied by the core.

Amount, if any, and type of material used to flavor the core material. In the case of ground meat, tomato sauce may be used to flavor the meat.

Amount of drying desired.

Type of packaging used.

While in each case the amount, composition and coherence of the farinaceous material may be approximately the same, the widely divergent nature of the materials used for coring requires a different treatment for each material. For instance, a relatively larger amount of tomato sauce, as compared to ground meat, will be used, and the difference in consistency between the two materials will require a corresponding adjustment of the apparatus. A product cored with tomato sauce, or a combination of ground meat and tomato sauce, will also be suitable only for canning, not for dry packaging; this means that only the outer surface of the cored tube will be dried, so as to prevent the cored tubes from adhering mutually during the processing and in the can. A product cored with cheese, however, is adaptable both to canning and to dry packaging, which means that such a product may be dried either superficially or completely. A few specific cases of the type included in this example are:

(a) Using the apparatus described, with suitable adjustments according to the materials used, and the specific type of product desired, a cored tube is produced having an outer, tubular, continuous sheathing of farinaceous material of the proper consistency, this material being similar to the material used in manufacturing macaroni. The supplementary extrusion apparatus partially fills the central space of the farinaceous tube with grated cheese which adheres to the inside walls. The cored tube is automatically cut off in predetermined lengths into the drying chamber and sent by conveyor to the drying chamber which is adjusted so as to dehydrate the cored tube sections almost completely; it is then packed in suitable cardboard containers.

(b) Again, using the apparatus described with suitable adjustments according to the materials used and the specific type of product desired, a cored tube is produced having an outer, tubular, continuous sheathing of farinaceous material of the proper consistency, this material being similar to the material used in manufacturing macaroni. The supplementary extrusion apparatus completely fills the central space of the farinaceous tube with a fairly thick combination of ground meat and tomato sauce. The drying chamber is adjusted so as to dry the cored tube only superficially; the superficially dried cored tubes, which do not adhere mutually, are then cut off into predetermined lengths and conveyed to cans for canning and cooking.

As an example of special constructions that are at times desirable for the production of these cored tubes the following is mentioned. Tubes made from a farinaceous paste containing amber durum semolina which is a material recognized as being of high quality for this purpose, show a disposition to mutually adhere if pieces of the moist extruded product are allowed to come in contact with each other; therefore, in addition to providing a drying chamber it will at times be found desirable to use a die so constructed as to give a fluted, beaded, or ribbed form to the outer periphery of the extruded cylinder to further assure nonadherence.

*Example 2.*—This example includes products in which the outer, continuous, tubular sheathing consists of a prepared cereal mixture such as bran, with other parts of wheat, similar to that used in the dry, ready-to-eat cereal industry. The inner core consists of ground raisins, figs, dates, prunes, or other dried fruit of a suitable nature. As in the first example, each individual case will vary as to the requirements of the finished product. In this case, however, dry packaging only is contemplated so that at least the outer tubular sheathing is substantially dried.

A specific case of the type included in this example is:

Using the apparatus described, with suitable adjustments according to the materials used, and the specific type of product desired, a cored tube is produced having an outer, continuous, tubular sheathing of a prepared bran product. The supplementary extrusion apparatus fills the central space of the outer tube completely with a suitable comminuted raisins preparation. The extruded product, which may have a diameter of $\frac{3}{32}''$, after almost complete dehydration, is cut into pieces about ½" long, roasted or toasted, and packed in a cardboard container.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of making a food product which comprises extruding a cored tube having an outer tubular coating of farinaceous material of sufficient coherence to produce a continuous sheathing and having a core of a different food material, drying said cored tube only superficially, and canning the same.

2. The method of making a food product which comprises extruding a cored tube having an outer tubular coating of farinaceous material of sufficient coherence to produce a continuous sheathing and having a core of protein material, drying said cored tube only superficially, canning and cooking the same.

3. The method of making a food product which comprises extruding a cored tube having an outer tubular coating of farinaceous material of sufficient coherence to produce a continuous sheathing and having a core of vegetable material, drying said cored tube only superficially, canning and cooking the same.

4. The method of producing a canned food product which comprises the immediately succeeding continuous steps of extruding a cored tube having an outer tubular coating of farinaceous material of sufficient coherence to produce a continuous sheathing and having a core of a different food material, surface drying said cored tube, and canning the same.

FREDERICK HAMMOND.